United States Patent [19]

Davidson et al.

[11] Patent Number: 5,304,589

[45] Date of Patent: Apr. 19, 1994

[54] STABILIZED POLYMERS AND THEIR PREPARATION

[75] Inventors: Neil S. Davidson; Hilda A. Leiper, both of Stirling; Colette A. A. Di Murro, Edinburgh; Kenneth Wilkinson, Dunblane, all of Scotland

[73] Assignee: BP Chemicals Limited, London, United Kingdom

[21] Appl. No.: 643,723

[22] Filed: Jan. 18, 1991

[30] Foreign Application Priority Data

Jan. 20, 1990 [GB] United Kingdom ............... 9001367

[51] Int. Cl.$^5$ .................. C08K 5/57; C08K 5/58; C08F 8/00; C08F 279/02
[52] U.S. Cl. ................................. 524/178; 524/179; 524/180; 525/149; 525/194; 525/290; 525/297
[58] Field of Search .............. 525/149, 290, 297, 194; 524/352, 353, 399, 324, 325, 178, 180, 179

[56] References Cited

U.S. PATENT DOCUMENTS

| B1 4,354,007 | 5/1987 | Scott | 525/370 |
|---|---|---|---|
| 3,310,503 | 3/1967 | Finkumoto et al. | 524/398 |
| 3,357,948 | 12/1967 | Stockman et al. | 524/324 |
| 3,983,091 | 9/1976 | Gloth et al. | 524/325 |
| 4,213,892 | 11/1980 | Scott | 525/384 |
| 4,226,991 | 10/1980 | Nakahara et al. | 544/221 |
| 4,238,575 | 12/1980 | Kleiner et al. | 525/212 |
| 4,354,007 | 10/1982 | Scott | 525/370 |
| 4,743,657 | 5/1988 | Rekers et al. | 525/281 |

FOREIGN PATENT DOCUMENTS

| 355900A | 8/1988 | European Pat. Off. . |
|---|---|---|
| 308105 | 8/1989 | European Pat. Off. . |
| 572579 | 6/1969 | France . |
| 263269 | 10/1975 | France . |
| 047625 | 9/1989 | Japan . |
| 047626 | 9/1989 | Japan . |
| 7502590 | 3/1974 | Netherlands . |
| 925117 | 5/1963 | United Kingdom . |
| 940953 | 11/1963 | United Kingdom . |
| 1068995 | 5/1967 | United Kingdom . |
| 2202226A | 3/1987 | United Kingdom . |

OTHER PUBLICATIONS

Chem. Abstracts, vol. 109, p. 130319s (JP 63089516).
"Rubber Chemistry & Technology", Weinstein, 1980, vol. 50 pp. 641–659.
"Development in Polymer Stabilization" Ed. by Scott Applied Science Pub. 1981, pp. 181–221.
"Rubber Chemistry and Technology", Kuczkowski et al. 1984, 57, pp. 620–651.

Primary Examiner—Paul R. Michl
Assistant Examiner—Tae H. Yoon
Attorney, Agent, or Firm—Brooks Haidt Haffner & Delahunty

[57] ABSTRACT

Oxidatively stabilized polyolefin polymers containing an antioxidant are made more resistant to loss of antioxidant by converting at least some of the antioxidant comprising a polymer of dicyclopentadiene and a phenolic compound into a form non extractable with cyclohexane. The conversion is preferably by reaction in the melt phase in the presence of a radical initiator. Addition of organotin esters, sulphides, oxides or thioethers reduces the color.

15 Claims, No Drawings

STABILIZED POLYMERS AND THEIR PREPARATION

This invention relates to stabilized polymers and their preparation and use.

The effectiveness of low molecular weight antioxidants in the stabilisation of polymers is often diminished in service by their ease of migration to the surface and extraction from the polymer. The problem of ease of migration and extraction can be reduced by the use a variety of higher molecular weight antioxidants but as their molecular weight increases, so compatibility with the base polymer tends to decrease, thus reducing their stabilising effect. U.S. Pat. No. 4,213,892 describes grafting polymers with antioxidants or UV stabilizers especially ones with ethylenic unsaturation or a thiol group, in the presence of a free radical generator; with low density polyethylene the free radicals may be made instead in the melt with air or by high shear. It has been found that without the free radical generator melt grafting of phenolic antioxidants in the polymer tends to be low so extraction of additive is high while with the generator polyethylene tends to be cross linked.

Incorporation of an antioxidant polymer from dicyclopentadiene and a phenolic compound with the polyolefin e.g. by melt processing in the presence of a radical initiator has now been found as a method of providing an improved stabilized polymer.

According to the present invention there is provided an oxidatively stabilized polymer composition comprising an olefin polymer and an antioxidant characterised in that the antioxidant comprises a polymer of dicyclopentadiene and a phenolic compound, at least some of the said antioxidant being in a form non extractable with cyclohexane. Preferably the oxidatively stable polymer composition is obtainable by reacting in the presence of a radical initiator and in the melt phase said polyolefin and said antioxidant polymer. The invention also provides a process for obtaining said polymer by reacting the polyolefin and the said antioxidant in the presence of a radical initiator and in the melt phase.

By reacting the olefin polymer and the antioxidant polymer, the antioxidant becomes not only olefin polymer compatible but a significant proportion is also non-extractable and this may be achieved with decreased adverse effects on the polymer e.g. cross linking in the case of polyethylene or degradation in the case of polypropylene.

The olefin polymer which is usually from one or more aliphatic monomers, can be a homopolymer, or a copolymer obtained from two or more different monomers. Suitable homopolymers are polyethylene, polypropylene and polybutylene, preferably polyethylene. The olefin copolymers are suitably copolymers of two or more monomers which may be solely mono olefins suitably $C_2$ to $C_{10}$ olefins (for example ethylene, propylene, butylene, 4 methyl pentene-1 and octene-1), or mixtures of at least one mono olefin with another ethylenically, unsaturated monomer e.g. vinyl alcohol, vinyl acetate and acrylic acid, methacrylic acid and their alkyl esters. Particularly preferred are homopolymers and copolymers of ethylene with a higher alpha olefin e.g. of 3-8 carbon atoms, especially linear ones of density 915-970 kg/m$^3$ e.g. 945-970 kg/m$^3$, in particular high density polyethylenes, such as ones obtained by use of Ziegler or preferably Phillips catalysts. The level of residual unsaturation in the olefin polymer especially homopolymer and copolymers of ethylene is usually 0.1-5 e.g. 0.5-2 expressed as the vinyl index (the ratio of infra red absorption at 910 cm$^{-1}$ due to vinyl group to that at 2020 cm$^{-1}$). In the ethylene copolymers the degree of branching is preferably less than 25 e.g. 0.01-25 such as 0.01-10 or 0.03-3 and most preferably 0.1-1 branches per 1000 carbons in the chain. In the case of polyethylene particularly for use with high proportions of antioxidants e.g. 10-100 parts per hundred (pph) of polymer it is preferred that linear polymers of high melt index are used e.g. of Melt Flow Rate (MFR) (measured as defined below) of 20-50 or 25-45 g/10 min. However, where polymers of higher olefins are used it is preferred to use linear polymers of low melt MFR e.g. 1-20 g/10 min.

The antioxidant polymer comprises a polymer of dicyclopentadiene with a phenolic compound. The phenolic compound usually has at least one and probably at least 2 of the 2, 4 and 6 positions free. The phenolic compound may be phenol itself or an alkyl phenol with 1-3 alkyl groups each of 1-6 carbon atoms, such as methyl, ethyl, isopropyl and tertiary butyl. While the phenolic compound may be an alkyl phenol with a 2-alkylsubstituent such as methyl or tertbutyl, e.g. as in 2-tert butylphenol and 2-tert butyl 4-methyl phenol, preferably both 2 and 6 positions are free as in the case of phenol itself and 4-alkyl phenols, which are preferred especially 4-primary or secondary alkyl phenols. The phenolic compound is most preferably phenol, para cresol (or commercial ortho/para mixtures) mixed meta/para cresol, or para ethyl phenol, especially para-cresol. The phenolic compound is usually free of sulphur containing groups. The polymers usually contain a molar excess of units from the phenolic compound, the molar ratio of phenolic to dicyclopentadiene (DCPD) units being usually 1.1-2:1 especially 1.15-1.35:1. The polymers which are addition polymers are usually phenolic unit terminated and contain phenolic groups. They may be made by nuclear substitution of the phenolic compound by the dicyclopentadiene in the presence of a Friedel Craft catalyst usually at less than 150° C. The polymers are usually substantially free of ethylenic unsaturation derived from the dicyclopentadiene molecule and substantially free of non aromatic unsaturation. The polymers are usually substantially linear, and are multifunctional because of the presence of more than one phenolic group. The polymers preferably contain a significant proportion of molecules having at least 3 phenolic units, e.g. 3-10 phenolic units and/or a significant proportion of molecules having at least 2 especially 2-10 DCPD units. The polymers are preferably mixtures of polymers with at least 10% usually at least 20% of higher polymer each with 3 or more phenolic units per molecule, such as 20-80% especially 50-70%, and at most 90%, usually at most 80% of polymer with 2 phenolic units per molecule, such as 20-80% especially 30-50%. The higher polymers may comprise mixtures of molecules having 3 phenolic (and 2 dicyclopentadiene) unit and 4 phenolic (and 3 dicyclopentadiene) units and 5 phenolic (and 4 dicyclopentadiene) units in weight percentages of 20-40%, 10-30% and 5-20% respectively, of the total weight of all the DCPD phenolic polymers.

When the phenolic compound has both 2 and 6 positions unsubstituted, and the polymer molecule is terminated by phenolic units it is preferred to end-cap the terminating phenolic units e.g. by nuclear alkylation or cycloalkylation, with a hindering group in a position ortho to the phenolic OH; examples of such hindering groups are tertiary butyl, tertiary amyl, isopropyl, alpha-methyl cyclohexyl, preferably tertiary butyl. Such polymer antioxidants are described in GB Patent 1068995, the disclosure of which is hereby incorporated by reference. Such antioxidants are available commercially under the trade name WINGSTAY L (from Goodyear).

The tert.butylated derivatives of the DCPD polymers, especially those in which the phenol is p-cresol, preferably have peak melting points of at least 80° especially at least 90° C. such as 80°-110° C. or especially 90°-103° C. such as 95°-102° C., have initial melting temperature of at least 70° C. e.g. 70°-95° C. but especially at least 85° C. such as 85°-95° C., and melt at temperature somewhere in the range 70°-115° C. especially 85°-115° C., and especially have not completely melted at 105° C.

The reaction between the olefin polymer and the antioxidant polymer is carried out in the presence of a radical initiator to facilitate the incorporation of the antioxidant into the polyolefin. The radical initiation can be effected by means of any of the conventional radical initiators especially ones only forming free radicals at a significant rate at above 120° C., for example organic peroxides or hydroperoxides or azo compounds such as azobisisobutyronitrile and radiation such as ultra violet or gamma radiation, preferably organic peroxides such as dicumyl peroxide which is most preferred 1,3-bis(t.butyl peroxy isopropyl benzene) or hydroperoxides such as tert butyl hydroperoxide. The level of organic peroxide is preferably with an antioxidant:peroxide weight ratio of between 4:1 to 14:1 especially 6:1 to 12:1 especially when the peroxide is dicumyl peroxide and pro rata equivalents with other peroxides and with an amount of peroxide of 0.5-10 such as 2.5-10 or 3.5-6.5 pph of polymer but especially 0.5-4.5 pph.

The reaction is preferably carried out in the melt phase typically in a melt mixer or an extruder, in which the polyolefin and antioxidant are intimately mixed in the melt phase during which period incorporation of the antioxidant into the polyolefin takes place. In the melt reaction, about 10-60% such as 15-50% e.g. 30-50% of antioxidant mixed with the polymer can be incorporated therein in a form which is not extractable with solvents for the antioxidant but not the polymer, specifically cyclohexane, in a Soxhlet apparatus. The retained form may be antioxidant grafted onto the polymer or polymerized antioxidant but is usually a mixture of both, especially one with 30-70% of each type.

The temperature at which the reaction is carried out will be dependent upon the melt temperature of the polymer, but is usually 150°-300° C. e.g. between 160° and 300° C., preferably 160°-220° C. e.g. for extruders and Banbury mixers, 200°-260° C. or 200°-250° C. especially 230°-255° C. The melt reaction is usually performed in an inert atmosphere e.g. under nitrogen atmosphere.

In the melt mixing reaction, suitable rotor speeds and reaction times, and in the extrusion reaction, suitable screw speeds will be dependent upon the equipment used but suitable conditions (for example rotor speed and reaction time) for effecting substantially complete mixing will be readily determined by the man skilled in the art. These conditions in this case usually correspond to occurrence of a significant proportion of, if not substantially complete, reaction. Reaction times of 1-30 e.g. 1-5 or 5-30 minutes and rotor speeds of 10-300 rev per minute may be used.

Under the conditions used to incorporate the antioxidant into polyethylene, cross-linking of polyethylene is a competing reaction. It is a particular feature of the present invention that by using the dicyclopentadiene phenol antioxidant as described above with polyethylene, the cross-linking of the polyethylene may be reduced to an acceptable level thereby enabling the polyethylene to be further processed melt processed such as e.g. by extrusion. The extent of cross linking is indicated by the change in the melt flow index of the polyethylene after the mixing reaction, and by the degree of gel formation. The higher the Melt Flow Rate of the polyethylene initially the lower the extent of cross linking, as is found with linear rather than non linear polyethylenes.

Thus according to a further aspect of the present invention there is provided an oxidatively stable polymer capable of being subsequently cross-linked if desired e.g. by free radicals and obtainable by reacting in the presence of a radical inhibitor and in the melt phase a polyolefin comprising a major proportion of polyethylene, especially linear polyethylene, and an antioxidant comprising said polymer of dicyclopentadiene and a phenolic compound.

The antioxidant can be incorporated in amounts to provide at least an effective amount e.g. at levels between 0.01 and 100 parts per hundred (pph) based on the weight of the polymer (i.e. 100 pph is 50% by weight of total polymer plus antioxidant), preferably 0.1-100 pph but the level is especially between 3 and 60 pph, to produce a masterbatch. This masterbatch can subsequently be mixed or diluted with further amounts of one or more olefin polymers which may be the same as or different from the olefin polymer used in the masterbatch but preferably within the broad definition of the olefin polymer as described above) to give the required antioxidant concentration. Antioxidant concentration in the final polymeric composition where no further dilution is intended e.g. when ready for final shaping to produce pipe, film or mouldings or coating for wire or cable or fibres, is suitably in the range 0.01 to 5 pph, preferably 0.03-3 pph.

The polymeric composition comprising olefin polymer incorporated with dicyclopentadiene phenolic compound can be used as such or after blending with conventional additives e.g. other antioxidants, antiblock and slip agents, UV stabilizers, fillers and blowing agents. In relation to other phenolic compounds such as antioxidants and/or metal deactivators, they may be added to the olefin polymer before or after the incorporation of DCPD/phenolic polymer into the olefin polymer.

Thus if desired the reaction of the dicyclopentadiene phenolic product with olefin polymer may be performed in the presence of at least one other phenolic compound in particular a hindered phenolic compound which may be an antioxidant and/or metal deactivator. Such hindered phenols usually have at least one and preferably 2 alkyl groups ortho to the phenolic group, in particular alkyl groups with 1-8 carbons especially 4-8 carbons, such as methyl, ethyl and tertbutyl. The phenolic compounds may contain no other non hydrocarbon functional groups, but advantageously the compounds also contain at least one oxalamide or hydrazide group, optionally also with at least one carboxylate group, especially such compounds with 2 phenolic rings. Preferred phenols of this type are bis (hindered phenolic) hydrazides, e.g. ones in which the phenolic ring may be bonded directly to the NH group of the hydrazide or via an alkylene group of 1-4 carbon atoms, e.g. methylene or ethylene as in substituted propionic hydrazides. The preferred phenol is N,N'-bis[3-(3,5-di-tertbutyl-4-hydroxy phenyl)propion]hydrazide, e.g. as sold under the trade mark IRGANOX MD1024 by Ciba Geigy. The phenolic compound may be used in amount of up to 150% by weight of the dicyclopentadiene phenolic polymer, e.g. 50-120%. The extra hindered phenol may increase the total antioxidant capacity of the polymer, but, particularly with the substituted phenolic compounds with hydrazide or oxalamide groups, may increase the overall stability to oxygen of the polymer by acting as deactivators of metals, e.g. transition metal catalyst residues or metals, e.g. copper from wire or cable. Preferably however the extra phenolic compound is absent so the reaction is performed with the dicyclopentadiene phenolic polymer (including alkyl or cycloalkyl derivatives thereof).

It has also been found the incorporation of the DCPD/phenol polymer into the olefin polymer tends to give discoloured products in particular in masterbatches with 10-100 pph DCPD/phenol polymer, though on dilution of the masterbatch with further polymer, the colour level is quite acceptable for many uses. However it has been discovered that addition to the incorporated olefin polymer e.g. the melt reaction product, in particular the masterbatch, of organotin carboxylate esters, sulphides, oxides or thioethers, significantly reduces the colour.

The present invention also provides a polymer composition of reduced colour which comprises (a) an oxidatively stabilized polymer composition of the invention, especially one obtainable by melt reaction in the presence of a free radical initiator, together with (b) at least one organotin compound, which is an organotin carboxylate, sulphide, oxide or thioether.

The organotin compound is usually a diorganotin compound of formula $R^1R^2Sn(OOCR^3)_2$ or $R^1R^2Sn(OOCR^4COOR^5)_2$ or $R^1R^2Sn(OOCR^4COO)$ $R^1R^2SnS, R^1R^2SnO$, $R^1R^2Sn(SR^6)_2$ or $R^1R^2Sn(SR^7COOR^8)_2$ in which each of $R^1$ and $R^2$, which are the same or different, represents an alkyl group, e.g. of 1-10 carbon atoms, e.g. methyl, butyl, hexyl or octyl, or an aromatic group, e.g. an aromatic hydrocarbyl group, such as one of 6-19 carbon atoms such as phenyl, tolyl or xylyl, or an aralkyl group of 7-20 carbon atoms such as an aralkyl hydrocarbyl group such as benzyl or 2-phenylethyl or a cyclo aliphatic group, e.g. of 5-7 carbon atoms such as cyclohexyl, each $R^3$ represents a group within the groups defined by $R^1$ and $R^2$ or may be an aliphatic ethylenically unsaturated hydrocarbyl group but is preferably an alkyl group of 6-20 carbon atoms such as n-octyl, 2-ethyl hexyl and undecyl, or a group such that the $OOCR^3$ group is a stearate or palmitate or oleate group, $R^4$ is a divalent organic group such as an alkylene group, e.g. of 1-10 carbon atoms such as methylene, 1,2 ethylene, 1,3-propylene, 1,4 butylene or 1,6 hexylene or an aliphatic ethylenically unsaturated hydrocarbyl group, e.g. of 2-8 carbon atoms such as one of formula —CH=CH—, $R^5$ is as defined for $R^3$, $R^6$ is a group within the group defined for $R^1$ and may be the same but is preferably different therefrom, being preferably an alkyl group of 6-20 carbon atoms, e.g. 10-20 carbon atoms such as dodecyl or stearyl or an aralkyl group such as benzyl, $R^7$ is a divalent group, preferably an alkylene group as defined for $R^4$ and $R^8$ is as defined for $R^5$. In the above formula there may be 2 oxygen or sulphur containing groups on the tin, and in these cases the two groups may be the same (as in dibutyl tin dilaurate) or different (as in dibutyl monolaurate monostearate).

Examples of the diorganotin compounds are dialkyltin dicarboxylates such as dibutyl and dioctyl tin dilaurates, dialkyl tin bis (monoalkyl maleate half esters) such as dibutyl and dioctyl tin bis (mono 2-ethylhexyl maleate), dibutyl and dioctyl tin maleate, dibutyl and dioctyl tin bis (dodecylmercaptide) and especially dibutyl and dioctyl tin bis (2-ethylhexyl thio glycollate), and their corresponding dimethyl tin derivatives. Preferably the diorganotin compounds are mixed with a minor proportion of the corresponding mono organotin tris compounds and/or tris organotin compounds e.g. diorgano tin bis (thio glycollate esters) mixed with mono organotin tris (thio glycollate esters) and/or tris organotin mono thioglycollate esters; amounts of the di organotin compounds can be 50-100% of the total of organotin compounds e.g. 60-80% or 80-98% with up to 50% in total of the other organotin compounds such as 2-20% or 20-40% in total of the other compounds. The mixtures with the tris and/or mono organotin compounds are particularly important with the diorganotin compounds of formula $R^1R^2Sn(SR^7COOR^8)_2$.

Advantageously the weight ratio of DCPD/phenol polymer to total organotin compound is 1:0.05-5 such as 1:0.1-1, especially 1:0.15-0.5.

The total amount of the above organotin compounds in the polymer composition of reduced colour is usually 10-10,000 ppm, such as 50-5000 ppm e.g. 100-1000 and especially 150-500 ppm (based on the total weight of olefin polymer). The organotin compounds are added to the oxidatively stabilized compositions of the invention, preferably those with 10-100 pph DCPD/phenol polymer, and are melt blended therewith, advantageously when the compositions are being diluted down from masterbatches to compositions ready for final use. The melt blending can be performed in manners known per se e.g. in a melt mixer or extruder such as a Bambury mixer or mono or twin screw extruder, at a temperature of for example 150°-250° C. e.g. 160°-210° C.

The polymer compositions of reduced colour are usually melt processable and can be converted e.g. by moulding or extrusion to form pipe, film, mouldings or coating for wire or cables, or for fibres, in particular for transparent or translucent products. Usually the melt processable polymer compositions of reduced colour are ones which remain melt processable after contact with water and therefore moisture curable polymers carrying pendant hydrolyzable silicon groups are usually substantially absent.

The invention will now be illustrated with reference to the following Examples in which an olefin polymer, a radical initiator (dicumyl peroxide (DCP) (from BDH Ltd) (except in Ex 11) and various antioxidants were mixed and heated to give polymeric products, which were tested for non extractable antioxidant content and melt flow rate (as a measure of cross linking) and in some cases for gel content (as a measure of cross linking) and oxygen induction time (as a measure of the stability to oxygen).

Materials

The antioxidants and DCP were used as received from the suppliers without further purification. The supplier and chemical name of the antioxidants used are shown in Table A. The polyolefins were those sold under the Trade Marks RIGIDEX HD 5502 and HD 6007 supplied by BP Chemicals Ltd. The RIGIDEX HD 5502 polyolefin was a high density polyethylene, which was an ethylene butene 1 copolymer with 1.3 branches per 1000 carbon atoms of density 953 kg/m$^3$ and in the powder form had a Melt Flow Rate (measured as defined below) of 27.0 g/10 min and, as measured under 2.16 Kg load, an MFR of 0.2 g/10 min. The RIGIDEX HD 6007 polyolefin was a high density polyethylene which was an ethylene butene 1 copolymer with less than 0.5 branches per 1000 carbon atoms of density 960 kg/m$^3$ and in the powder form had a Melt Flow Rate (measured as defined below) of 39 g/10 min and, as measured under 2.16 kg, an MFR of 0.7 g/10 min. Both ethylene copolymer had been made with a Phillips catalyst and contained about one vinyl group per polymer chain. The vinyl indices (the ratio of the infrared absorption at 910 cm$^{-1}$ characteristic of vinyl to that at 2020 cm$^{-1}$) were 1.31 and 1.37 for the RIGIDEX HD5502 and HD6007 respectively.

Wingstay product had an average molecular weight of 600–700.

The melting proportions of the WINGSTAY, VULKANOX and SANTOWHITE products were later determined by Differential Scanning Calorimetry. The results were as follows.

|  | Initial Melt Pt °C. | Peak Melt Pt °C. | Melting Range °C. |
|---|---|---|---|
| SANTOWHITE HL | 75.6 | 83.6 | 75.6–93.9 |
| WINGSTAY L | 88.3 | 99.5 | 88.3–111 |
| VULKANOX | 90.4 | 96.6 | 90.4–101.8 |

Melt Processing

The melt mixing reactions of Ex 1–7 and A–N were carried out in a Haake Rheocord Torque rheometer, under a nitrogen atmosphere while the extrusion reaction in Ex 8 was performed in a Leistritz twin screw extruder.

Determination of Non-extractable Antioxidant

The level of non extractable antioxidant, which was incorporated into the polyethylene during the melt reaction, was determined gravimetrically by Soxhlet

TABLE A

| Trade Name | Supplier | Chemical Name |
|---|---|---|
| Cyanox 1790 | American Cyanamid | 1,3,5-tris(4'-tert-butyl,5'-hydroxy-2',6'-dimethylbenzyl) isocyanurate |
| Ethanox 330 | Ethyl | 1,3,5-tris(3',5'-ditert-butyl-4'-hydroxybenzyl)-2,4,6-trimethylbenzene |
| Goodrite 3114 | BF Goodrich | 1,3,5-tris(3',5'-ditert-butyl-4'-hydroxybenzyl)-isocyanurats |
| Goodrite 3125 | BF Goodrich | Tris((3-(3',5'-ditert-butyl-4'-hydroxybenzyl)-2"-acetoxy-ethyl))isocyanurate |
| Hostanox 03 | Hoechst | Ethylene glycol bis((3,3-bis(3'-tert-butyl-4'-hydroxyphenyl) butyrate)) |
| Irganox 1010 | Ciba-Geigy | Pentaerythrityltetrakis (3-(3',5'ditertbutyl-4-hydroxyphenyl) propionate) |
| Irganox 1035 | Ciba-Geigy | Benzenepropanoic acid, 3,5-bis (1,1-dimethylethyl)-4-hydroxy-, thiodi-2,1-ethanediyl ester |
| Lowinox 22M46 | Chemische Werke Lowi | 2,2'-methylenebis(4-methyl,6-tert-butylphenol) |
| Topanol CA | ICI | 1,1,3-tris(2'-methyl-4'-hydroxy-5'-tert-butyl-phenyl)butane |
| Irganox 1076 | Ciba-Geigy | Stearyl beta-(3,5-ditert-butyl-4-hydroxyphenyl)-propionate |
| Wingstay L | Goodyear | Butylated Reaction Product of p-cresol and Dicyclopentadiene |
| Vulkanox SKF | Bayer | Butylated Reaction Product of p-cresol and Dicyclopentadiene |
| Santowhite ML | Monsanto | Butylated Reaction Product of p-cresol and Dicyclopentadiene |

The Wingstay L and Vulkanox products were a mixture of polymers with about 37–41% of polymer with 2 phenol and 1 DCPD units about 27–31% of polymer with 3 phenol and 2 DCPD units, about 17–21% of polymer with 4 phenol and 3 DCPD units and 10–14% of polymer with 5 phenol and 4 DCPD units and the remainder higher polymers still. The percentages were estimated from peak areas following analyses by size exclusion chromatography with UV response. The extraction and is quoted in units of pph. About 10 g of product was extracted over an appropriate refluxing solvent in which the antioxidant but not the polymer was soluble, (for example cyclohexane was used in the case of the antioxidants in Ex 1–3. The extraction period was dependent upon the ease of removal of extractable antioxidant by the solvent and extraction was continued until the weight of the material undergoing extraction remainedconstant, indicating that all extractable material had been removed. Usually 12 hr extraction was sufficient. The higher the degree of cross linking the greater was the difficulty in extracting antioxidant.

Determination of Polymer Melt Flow Rate (MFR)

The melt flow rate of the product of the melt reaction was taken as a guide to the degree of cross-linking on the basis that the lower the MFR with respect to the base polymer the greater the extent to which cross-linking had occurred.

The MFR was measured according to BS3412: 1976, 1S01133-1981: condition 7, at 190° C. using a Davenport melt indexer with an applied load of 21.6 kg the conditions under which all the MFR values in this specification are quoted, unless otherwise stated.

EXAMPLE 1

The antioxidant sold under the trademark WINGSTAY L and the HDPE RIGIDEX HD 5502 polyethylene were melt mixed in a Haake Rheocord melt mixer. The Wingstay L product was charged at 30 pph (based on a hundred parts of polymer) with 5 pph of Dicumyl Peroxide (DCP) also charged.
Charge=46 g
Set temperature=250° C.
Reaction time=10 mins
Rotor speed=55 rpm The polymeric product was extracted for 12 hours with cyclohexane and the level of non-extractable antioxidant determined to be 12 pph i.e. (40% retention relative to antioxidant originally mixed with polymer).

The MFR of the extracted polymer product=17.0 g/10 min.

EXAMPLES 2 AND 3 AND COMPARATIVE EX A-P

The antioxidant WINGSTAY L of Ex 1 was replaced by each of the antioxidants Santowhite ML and Vulkanox SKF and the mixtures were otherwise processed exactly as in Example 1. The results are given in Table I.

The process was then repeated for comparative purposes with other antioxidants with the same or different amounts of initiator and the compositions obtained were tested according to the method given in Example 1. For comparison the MFR of the polyolefin after melting of the powder and pelletization was also determined. The results are tabulated in Table I; any difference in level of amount of peroxide used is indicated below.

TABLE I

COMPARISON OF DIFFERENT ANTIOXIDANTS

| Example | Antioxidant charged at 30 pph level | Level of Non-extractable Antioxidant (pph) | MFR 21.6 kg load (g/10 min) (after extraction) |
|---|---|---|---|
| 1 | Wingstay L | 12 | 17 |
| 2 | Santowhite ML | 5 | 18.3 |
| 3 | Vulkanox SKF | 8 | 18.5 |
| A | Irganox 1010 | 22 | Did not flow |
| B | Irganox 1035 | 18 | Did not flow |
| C | Topanol CA | 13 | 7.0 |
| D | Cyanox 1890 | 12 | 0.3 |
| E | Goodrite 3114 | 13 | Did not flow |
| F | Ethanox 330 | 10 | 0.5 |
| G | Hostanox 03 | 23 | Did not flow |
| H | Goodrite 3125 | 21 | Did not flow |
| N | Lowinox 22M46 | 3 | 12.3 |
| | ABOVE REACTED WITH 5 pph DCP | | |
| I | Irganox 1010 - | 20 | Did not flow |
| | Ex I REACTED WITH 2.5 pph DCP | | |

TABLE I-continued

COMPARISON OF DIFFERENT ANTIOXIDANTS

| Example | Antioxidant charged at 30 pph level | Level of Non-extractable Antioxidant (pph) | MFR 21.6 kg load (g/10 min) (after extraction) |
|---|---|---|---|
| J | Irganox 1010 | 23 | Did not flow |
| K | Hostanox 03 - | 23 | Did not flow |
| | Ex J, K REACTED WITH 1 pph DCP | | |
| P | None | — | 8.4* |
| | Ex P had no DCP | | |

*Not extracted

EX 4-6

The process of Ex 1 was repeated for Ex 4 and 5 but with a set temperature for mixing at 160° C. and 200° C. respectively. For Ex 6 the melt mix product of Ex 1 was remelted at 250° C. and mixed with further RIGIDEX HD 5502 polyethylene to give a polymer product having a total level of antioxidant of 1000 ppm.

The gel content was tested for the products of Ex 1 and 4-6 and the results are tabulated in Table II. The gel content analysis was based upon BS5468:1977.

TABLE II

GEL CONTENT ANALYSIS

| EXAMPLE | % w/w GEL |
|---|---|
| 1 | 1.7 |
| 4 | 0.7 |
| 5 | 0.6 |
| 6 | <0.1 |

EX 7

In a modification of the process of Ex 6 the process of Ex 1 was repeated (to provide Ex 7) with an initial level of antioxidant in the mixer reaction of 6 pph (instead of 30 pph) and 0.95 pph DCP. The melt reaction products of Ex 1 and 7 were each divided into 2 samples one pair of which was extracted and the other pair not extracted; subsequently the non extracted product samples were diluted with 221 times their weight of more RIGIDEX HD 5502 polymer down to a level of 1000 ppm antioxidant. The extracted product samples were similarly diluted with 221 parts of the same polymer. The Oxygen Induction Time OIT of the diluted products was determined at 200° C. in a Stanton Redcroft STA 785 simultaneous TG/DGC apparatus. The results are shown in Table III as are those of the products of Ex 6, and are compared to those of RIGIDEX HD5502 polymer alone and to those with blend compositions of the polyolefin and 1000 ppm IRGANOX 1010 (made in the absence of DCP) before and after extraction.

TABLE III

OXYGEN INDUCTION TIMES

| EXAMPLE | OIT WITHOUT EXTRACTION | OIT WITH EXTRACTION |
|---|---|---|
| COMP. (Q) Irganox 1010 | 27.5 min | 1.2 min |
| 1 | 22 min | 5 min |
| 7 | 16 min | 4.6 min |
| RIGIDEX HD5502 | 1.2 min | |

EXAMPLE 8

The process of Ex 1 was repeated with 6 pph WINGSTAY L antioxidant and RIGIDEX HD 6007 polyethylene and 0.67 pph DCP reacted in a Leistritz twin screw extruder with set temperature profile of 180°–210° C.

The product was extracted for 12 hours with cyclohexane and the level of non-extractable antioxidant determined to be 1.4 pph.

The MFR of the extracted material = 7.3 g/10 min.

EXAMPLE 9

The process of Ex 1 was repeated with a set temperature of 230° C. and a homo polypropylene having an MFR (under 2.16 kg load at 230° C.) of 2.35 g/10 min, sold by Hoechst under the Trade Mark HOSTALEN PPN 1060F3. The level of non extractable antioxidant was determined to be 7 pph and the MRF of the extracted polymer product (measured under a 2.16 kg load at 210° C.) was 3.7 g/10 min).

EXAMPLE 10

The process of Ex 1 was repeated with a set temperature of 200° C. and RIGIDEX HD 6007 polyethylene and 30 pph of WINGSTAY L antioxidant and separately for comparison 30 pph of IRGANOX 1076 antioxidant. The levels of non extractable antioxidants were determined to be both 9 pph and the MFR values of the polymer products were 18.2 g/10 min and 1.78 g/10 min respectively.

EXAMPLE 11

The process of Ex 1 was repeated with a set temperature of 180° C. and 3 pph of 1,3-bis(t butyl peroxyisopropyl)benzene instead of the DCP. The level of non extractable antioxidant was determined to be 7.3 pph and the MFR of the extracted polymer product was 18 g/10 min.

COMPARATIVE EXAMPLE R

The process of Ex 6 was repeated with the LOWINOX 22M46 antioxidant (as in Ex N) instead of WINGSTAY L and the melt product without extraction was diluted 221 times as in Ex 7 to give a product, whose OIT at 200° C. was measured to be 4.3 min.

EXAMPLE 12

The process of Example 1 was repeated with a set temperature of 160° C. to give a masterbatch with a level of non extractable antioxidant of 9 pph and an MFR of extracted product of 18 g/10 minutes.

The masterbatch was melt mixed at 180° C. with more RIGIDEX HD5502 polyethylene to dilute it to give a final polymer composition containing 1000 ppm of WINGSTAY L antioxidant. The polymer composition was tested for Yellowness Index by the method of ASTMD 1925 on an Intern. Colour System MICROMATCH apperatus measuring reflectance and set to Wavelength of 400–700 nm simulating daylight without UV.

EXAMPLES 13 AND 14

The process of Ex 12 was repeated with IRGASTAB 17 MOK-A product sold by Ciba Geigy (a mixture of a majority of di butyl tin bis (isoctylthio glycollate with small amounts (in total in the range 2–20% of total product) of monobutyl tin tris (isooctylthioglycollate) and tri butyl tin isooctylthioglycollate) added at the masterbatch dilution step in amount to provide 300 ppm or 200 ppm in total of organotin compounds in the final polymer composition. The Yellowness Indices were measured.

The Yellowness Index results were as given below.

| Example | Sample | Yellowness Index |
|---|---|---|
|  | HD 5502 additive free | −0.68 |
|  | Diluted Masterbatch | 59 |
| 13 | Diluted masterbatch with IRGASTAB 17 MOK-A (300 ppm) | 15 |
| 14 | As Ex 13 but 200 ppm IRGASTAB | 17 |

EXAMPLE 15

The process of Example 1 was repeated in a Bambury mixer under nitrogen at 200° C. set temperature and rotor speed of 200 rpm for 2–3 min with a charge of total weight of 2.5 kg of RIGIDEX HD6007 polyethylene, 30 pph Wingstay L antioxidant and 3.75 pph DCP as initiator. The level of non extractable antioxidant was 10.4 pph and the MFR of the extracted polymer product was 7.4 g/10 min.

We claim:

1. An oxidatively stabilized melt processable polymer composition comprising an olefin polymer and an antioxidant which comprises a polymer of dicyclopentadiene and a phenolic compound, said antioxidant having been reacted with said olefin polymer so that at least some of the antioxidant is in a form non-extractable with cyclohexane.

2. A composition according to claim 1, characterized in that it is obtainable by reacting said olefin polymer and said antioxidant in the presence of a radical initiator and in the melt phase.

3. A composition according to claim 1 or 2 characterised in that it is cross linkable and the olefin polymer is a polyethylene with a major proportion of ethylene.

4. A composition according to claim 3 characterised in that the polyethylene is high density polyethylene.

5. A composition according to claim 1 or claim 2 characterised in that the phenolic compound is phenol or a mono methyl or ethyl phenol.

6. A composition according to claim 1 or claim 2 characterised in that the antioxidant has terminal phenolic units and has been endcapped with a tertiary butyl hindering group ortho to the phenolic hydroxyl group.

7. A composition according to claim 1 or claim 2 characterised in that the antioxidant is present in an amount of 0.1–100 parts per hundred parts of olefin polymer.

8. A masterbatch composition according to claim 7 characterised in that the antioxidant is present in an amount of 3–60 parts per hundred of of olefin polymer.

9. A polymer composition which comprises a blend of a composition according to claim 1 or claim 2 characterised in that it also contains an olefin polymer.

10. A composition according to claim 1 characterized in that it comprises at least one organotin compound which is an organotin carboxylate, thioether, oxide or sulphide.

11. A composition according to claim 10 characterized in that the organotin compound comprises a di alkyl tin bis (mercapto alkylene carboxylate ester).

12. A composition according to claim 10 or 11 characterized in that the weight ratio of dicyclopentadiene phenolic polymer to organo tin compound is 1:0.1-1.

13. A composition according to claim 10 or 11 characterized in that it contains 100-1000 ppm in total of the organotin compound based on the total weight of olefin polymer.

14. A method of making an oxidatively stabilized polymer composition comprising an olefin polymer and antioxidant characterised by reacting in the presence of a radical initiator and in the melt phase, said olefin polymer with antioxidant, which is a polymer of dicyclopentadiene and a phenolic compound.

15. A composition according to claim 1 wherein a significant portion of said antioxidant is in a form that is non-extractable with cyclohexane.

* * * * *